(12) United States Patent
Uesaka et al.

(10) Patent No.: US 6,176,433 B1
(45) Date of Patent: Jan. 23, 2001

(54) READER/WRITER HAVING COIL ARRANGEMENTS TO RESTRAIN ELECTROMAGNETIC FIELD INTENSITY AT A DISTANCE

(75) Inventors: Kouichi Uesaka, Yokohama; Yoshihiko Hayashi, Setagaya-ku; Takashi Suga; Masami Makuuchi, both of Yokohama; Ryozo Yoshino, Hadano, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/079,226

(22) Filed: May 15, 1998

(30) Foreign Application Priority Data

May 15, 1997 (JP) .................................................... 9-125704

(51) Int. Cl.⁷ .................................................... G06K 19/06
(52) U.S. Cl. ............................................ 235/492; 235/380
(58) Field of Search ......................................... 343/895, 742, 343/867; 235/380, 375, 382, 382.5, 492

(56) References Cited

U.S. PATENT DOCUMENTS

| | | | |
|---|---|---|---|
| 4,922,261 | * | 5/1990 | O'Farrell .............................. 343/742 |
| 5,103,234 | * | 4/1992 | Watkins et al. ....................... 343/742 |
| 5,418,358 | * | 5/1995 | Bruhnke et al. ..................... 235/492 |
| 5,449,894 | * | 9/1995 | Bruhnke et al. ..................... 235/492 |

FOREIGN PATENT DOCUMENTS

| | | | |
|---|---|---|---|
| 785233 | * | 3/1995 | (JP) . |
| 962816 | * | 3/1997 | (JP) . |
| 9212606 | * | 8/1997 | (JP) . |

* cited by examiner

Primary Examiner—Karl D. Frech
(74) Attorney, Agent, or Firm—Antonelli, Terry, Stout & Kraus, LLP

(57) ABSTRACT

The present invention provides a reader and/or writer for performing both the supply of operating power to an IC card and transmission of a communication signal to the IC card or transmission and reception thereof to and from the IC card, wherein a main coil or a spiral antenna for generating an electromagnetic field for the two or at least power supply, and auxiliary coils or spiral antennas for generating magnetic fields opposite in phase to the electromagnetic field generated by the main coil or spiral antenna to thereby restrain the intensity of the electromagnetic field in the distance are provided side by side.

17 Claims, 12 Drawing Sheets

READER/WRITER HAVING COIL ARRANGEMENTS TO RESTRAIN ELECTROMAGNETIC FIELD INTENSITY AT A DISTANCE

BACKGROUND OF THE INVENTION

The present invention relates to a reader and/or writer for performing transmission of proximity radio operating power to and communications with proximity radio cards such as a cash card, a credit card, a railway ticket, a commutation ticket, a coupon ticket, a management card, an ID card, a license, etc. employed in, for example, a cash dispenser, electronic money, an automatic checking and collecting system, a room in/out management system, etc.

It has heretofore been known in Japanese Patent Application Laid-Open Nos. Hei 7-85233 and 9-62816 that power is supplied to a proximity radio card (IC card) from the power supply side in a noncontact manner with the card by using light or magnetic fields.

In a noncontact card system (proximity radio card system) wherein when cash cards, credit cards, railway tickets, commutation tickets, etc. to be used at wickets in railway stations or on buses or at entrances and exits or the like are brought into IC cards, and when a user causes his/her IC card to pass through a reader and/or writer provided at a wicket in a railway station or on a bus or at an entrance and exit or the like in a noncontact manner with the reader and/or writer, a power transmitting wave or a communication wave is radiated from a coil or an antenna of the reader and/or writer and the electromagnetic wave is received by and thereby a voltage is induced by a coil or an antenna provided on the card side to thereby operate circuits on the card side, whereby a signal is detected, the electric field radiated from the coil or antenna of the reader and/or writer needs to satisfy the restricted value (500 $\mu$V/m at a distance of 3 m) of the Wireless Telegraphy Act.

However, a problem arises in that since the upper limit of the value of a current flowing through the coil or antenna for the reader and/or writer is determined under the restricted value (500 $\mu$V/m at the distance of 3 m) of the radiated electric field according to the Wireless Telegraphy Act and the upper limit of the intensity of a magnetic field necessary for power transmission and communications is determined according to the upper limit of the current value, a communicable range is restricted.

Japanese Patent Application Laid-open No. Hei 9-212606 as a prior art discloses a noncontact reader and/or writer having three or more loop coils wherein carrier signals, which are different in phase to each other, are applied at a predetermined frequency across each of the plurality of loop coils with a phase shifter to cancel electromagnetic fields at a distant so that effect upon radiation to peripheral devices is suppressed. In such a prior art, however, a waveform on which magnetic fields generated from each coil are overlapped is supplied to a card. As a result, the overlapped wavefom has a waveform width wider than that of a desired waveform, resulting in deformation. Thus, it is impossible to transmit correct information.

SUMMARY OF THE INVENTION

With the foregoing problems in view, it is therefore an object of the present invention to provide a reader and/or writer suitable for use in a proximity radio card system, which is capable of satisfying the restricted value (500 $\mu$V/m at a distance of 3 m) of a radiated field according to the Wireless Telegraphy Act, and enlarging a communicable range, i.e., a communicable distance between the reader and/or writer and a proximity radio card (IC card) to establish good communications.

According to one aspect of this invention, for achieving the above object,'there is provided a reader and/or writer having a main coil or a spiral antenna for generating an electromagnetic field for performing both the supply of operating power to an IC card and transmission of a communication signal to the IC card or transmission and reception thereof to and from the IC card.

According to another aspect of this invention, for achieving the above object, there is provided a reader and/or writer for performing both the supply of operating power to an IC card and transmission of a communication signal to the IC card or transmission and reception thereof to and from the IC card, which comprises an antenna wherein a plurality of coils or spiral antennas are caused to distribute currents lying in the same direction and opposite in phase or lying in the opposite direction and being in phase to thereby generate magnetic fields serving as components opposite in phase to each other and the directivities thereof are synthesized, whereby power transmission and satisfactory communications are allowed in mutually interference-free very near areas and the magnetic fields interfere with each other and cancel out each other in the distance so that the radiated electric field is restrained. Owing to the above construction, a communicable range can be greatly enlarged or controlled while obeying the Wireless Telegraphy Act.

According to a further aspect of this invention, for achieving the above object, there is provided a reader and/or writer for performing the supply of operating power to an IC card and transmission or transmission and reception of a communication signal to and from the IC card, comprising a main coil or a spiral antenna for generating an electromagnetic field used for the two or power supply, and auxiliary coils or spiral antennas for generating magnetic fields opposite in phase to the electromagnetic field generated by the main coil or spiral antenna to thereby control or restrain the intensity of the electromagnetic field in the distance.

According to a still further aspect of this invention, for achieving the above object, there is provided a reader and/or writer for performing both the supply of operating power to an IC card and transmission of a communication signal to the IC card or transmission and reception thereof to and from the IC card, comprising a main coil or a spiral antenna for generating an electromagnetic field used for the two or power supply, and auxiliary coils or spiral antennas for generating axial magnetic fields opposite in direction to the electromagnetic field generated by the main coil or spiral antenna to thereby restrain the intensity of the electromagnetic field in the distance.

In the reader and/or writer according to the present invention, the main coil or spiral antenna and the auxiliary coils or spiral antennas are respectively supplied with power so as to differ in phase from each other.

Further, in the reader and/or writer according to the present invention, the main coil or spiral antenna and the auxiliary coils or spiral antennas are constructed so as to differ in winding direction from each other.

Moreover, in the reader and/or writer according to the present invention, the main coil or spiral antenna and the auxiliary coils or spiral antennas are respectively supplied with power so as to differ in phase from each other as to a power transmitting wave and supplied with power in phase with each other as to a signal wave.

According to a still further aspect of this invention, for achieving the above object, there is provided a reader and/or writer for performing both the supply of operating power to an IC card and transmission of a communication signal to the IC card or transmission and reception thereof to and from the IC card, wherein a main coil or a spiral antenna for generating an electromagnetic field for the two or power supply and auxiliary coils or spiral antennas for restraining the intensity of the electromagnetic field in the distance generated by the main coil or spiral antenna are provided side by side.

According to a still further aspect of this invention, for achieving the above object, there is provided a reader and/or writer for performing both the supply of operating power to an IC card and transmission of a communication signal to the IC card or transmission and reception thereof to and from the IC card, wherein a main coil or a spiral antenna for generating an electromagnetic field used for the two or power supply and auxiliary coils or spiral antennas are provided side by side and an area extending in a transverse direction of a magnetic-field intensity distribution is enlarged.

In the reader and/or writer according to the present invention, the main coil or spiral antenna and the auxiliary coils or spiral antennas are respectively supplied with power so that currents to flow through the main coil or spiral antenna and the auxiliary coils or spiral antennas are different in amplitude from one another.

According to a still further aspect of this invention, for achieving the above object, there is provided a reader and/or writer for performing both the supply of operating power to an IC card and transmission of a communication signal or transmission and reception thereof to and from the IC card, comprising coils or spiral antennas for generating electromagnetic fields used for the two or power supply, and wherein the directions of winding of the coils or spiral antenna are reversed by portions for inverting the phases of current distributions on lines of the coils or spiral antennas, currents on the lines are inverted in phase and axial magnetic fields are set to be in phase with each other.

The reader and/or writer according to the present invention includes a power supply portion for generating a power transmitting signal, an encoder circuit for encoding input transmitting data, a modulator for amplitude-modulating the signal obtained from the power supply portion and superimposing the amplitude-modulated signal on the signal outputted from the encoder circuit, and a power feeding circuit for feeding power to the main coil or spiral antenna and the auxiliary coils or spiral antennas, based on a signal obtained from the modulator.

Further, the reader and/or writer according to the present invention includes a power supply portion for generating a power transmitting signal, an encoder circuit for encoding input transmitting data, a modulator for amplitude-modulating the signal obtained from the power supply portion and superimposing the amplitude-modulated signal on the signal outputted from the encoder circuit, and a power feeding circuit for feeding power to the coils or spiral antennas, based on a signal obtained from the modulator.

Moreover, the reader and/or writer according to the present invention includes a power supply portion for generating a power transmitting signal, a modulator for modulating the signal obtained from the power supply portion, and a power feeding circuit for feeding power to the main coil or spiral antenna and the auxiliary coils or spiral antennas, based on a signal obtained from the modulator.

Owing to the above-described constructions, it is possible to allow large currents to flow while an electric field in the distance is being restrained and the Wireless Telegraphy Act is being obeyed. Therefore, the intensity of a magnetic field in the vicinity of a reader and/or writer can be strengthened and a communicable range can be enlarged.

BRIEF DESCRIPTION OF THE DRAWINGS

Other objects and advantages of the present invention will be more completely understood from the following detailed description, taken in conjunction with the accompanying drawings wherein.

DETAILED DESCRIPTION OF THE PREFERRED EMBODIMENTS

Preferred embodiments of the present invention will hereinafter be described with reference to the accompanying drawings.

A description will first be made of a system for a transmitting noncontact card operating power between noncontact cards such as a cash card, a credit card, a railway ticket, a commutation ticket, a coupon ticket, a management card, an ID card, a license, etc. employed in a cash dispenser, electronic money, an automatic checking and collecting system, a room in/out management system, etc., and a reader and/or writer, and a communication antenna suitable for use in the system.

Figure 1:
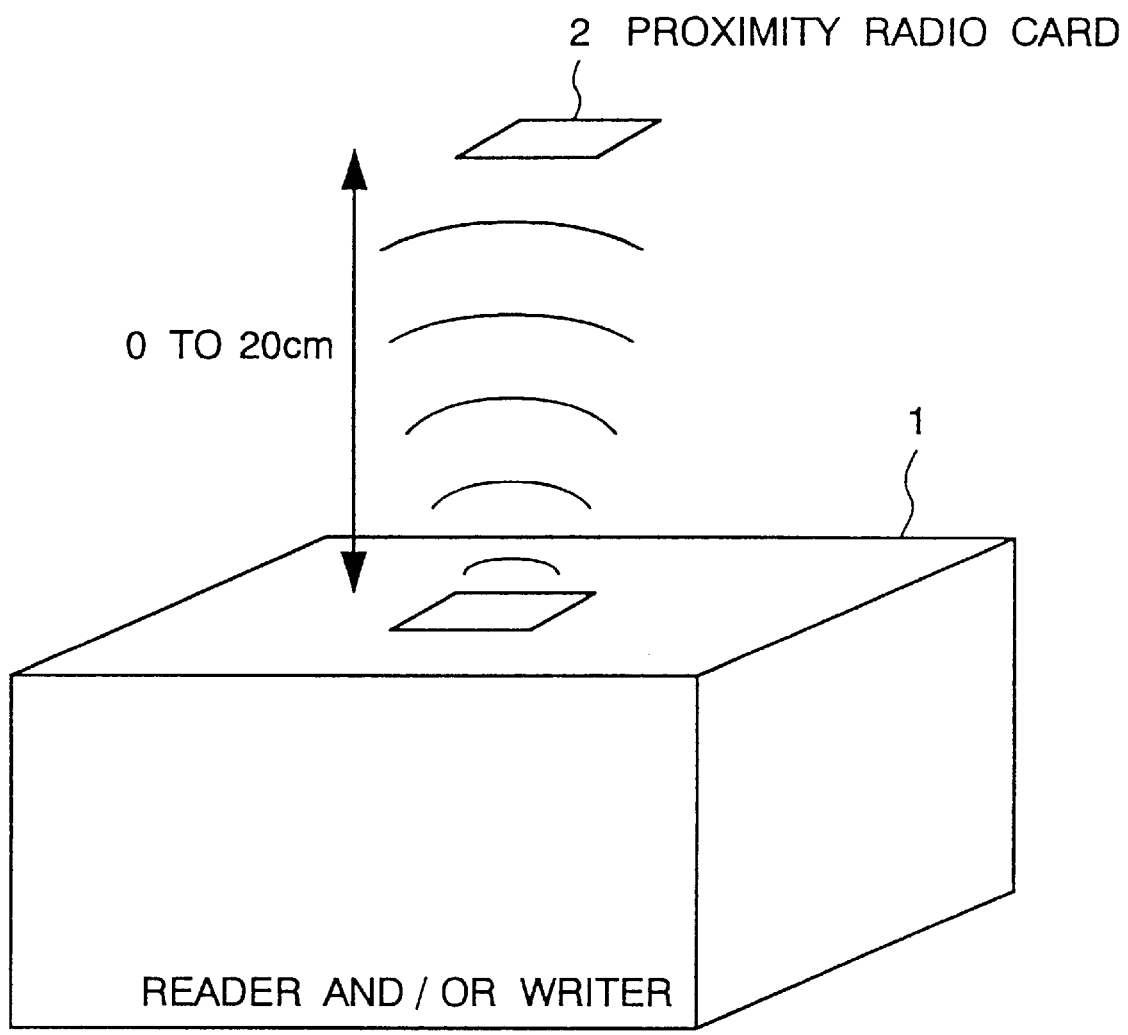
FIG. 1 is a schematic configurational perspective view showing a power transmission/communication system wherein power is transmitted by radio between a reader and/or writer according to the present invention and a proximity radio card (IC card) and communications are done therebetween via radio.

FIG. 1 is a diagram schematically showing a configuration of a power transmission/communication system wherein power is transmitted by radio from a reader and/or writer 1 provided at a wicket or on a bus or at an entrance and exit or in a predetermined place to a noncontact card (proximity radio card: IC card) 2 to be passed by the reader and/or writer 1 with noncontact or in close proximity to it and communications are done or established therebetween vi a radio. The noncontact card (proximity radio card: IC card) 2 is carried by a user and caused to pass through the reader and/or writer 1 provided at a wicket or on a bus or at an entrance and exit with noncontact therewith, at a distance of, e.g., about 20 cm away therefrom to thereby transmit and receive information about a cash card, a credit card, a railway ticket, a commutation ticket, etc., by radio, thus making it possible to perform the role of the cash card, credit card, railway ticket, commutation ticket, etc.

Figure 2:
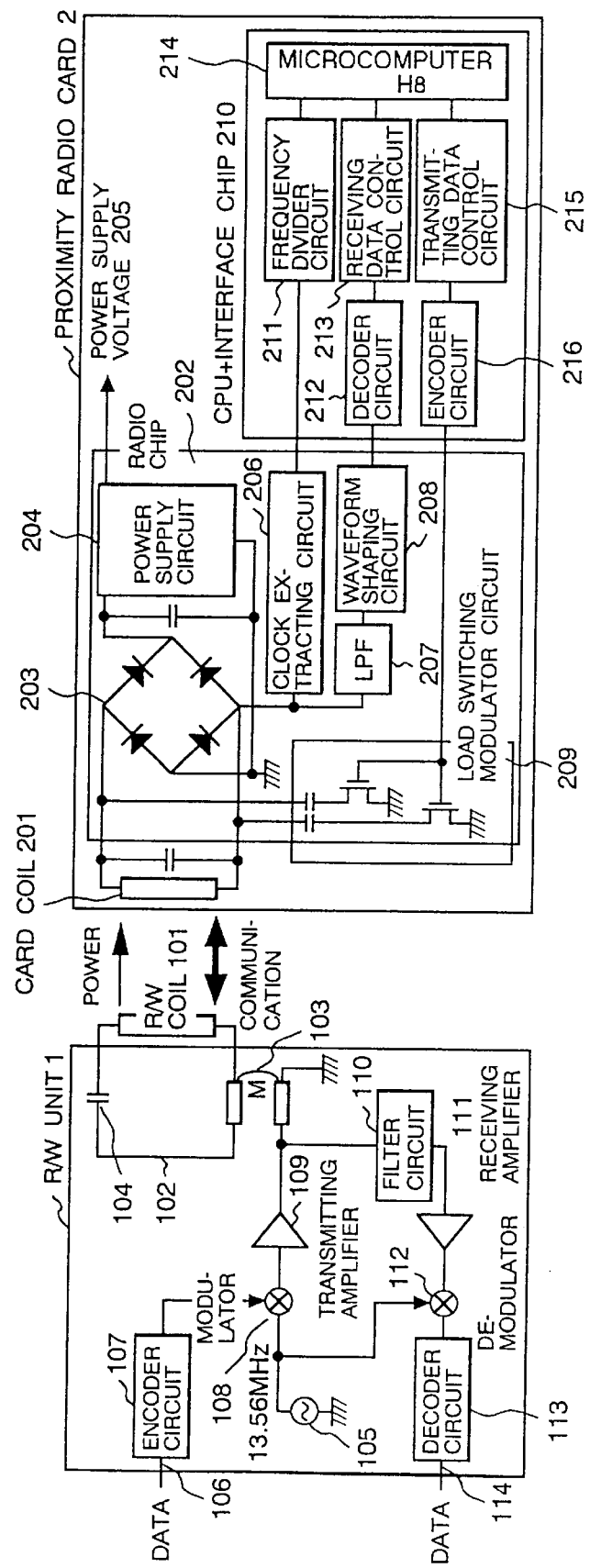
FIG. 2 is a block diagram illustrating one embodiment of a system wherein power is transmitted by radio between a reader and/or writer according to the present invention and a proximity radio card (IC card) and communications are made therebetween via radio.
Figure 3:
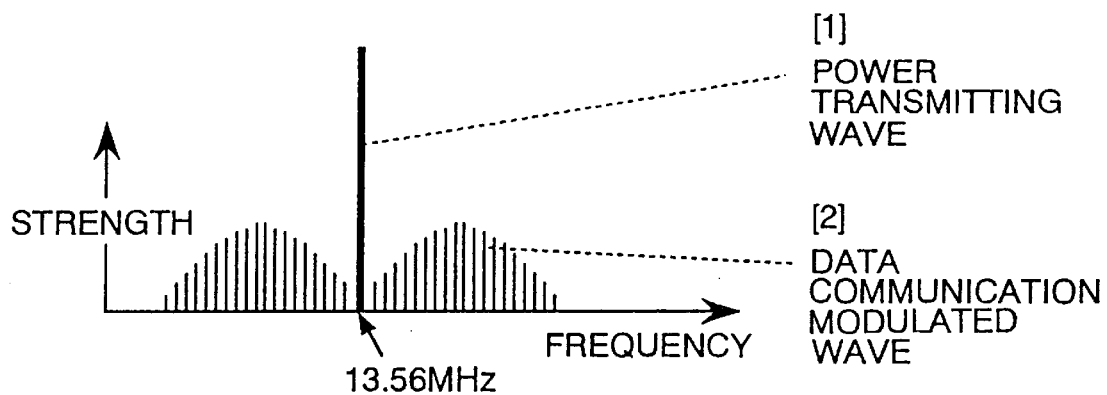
FIG. 3 is a diagram showing the relationship between a power transmitting wave and a modulated wave for data communications according to the present invention.

FIG. 2 is a block diagram showing one embodiment of a system wherein power is transmitted by radio between a reader and/or writer 1 according to the present invention and a noncontact card (proximity radio card: IC card) 2 and information is further transmitted and received (communicated) by radio. The embodiment shown in FIG. 2 shows the case in which both the transmission of power and the transmission and reception of communications are carried out by an electromagnetic wave (radio) comprised of a power transmitting wave and a data communication modulated wave shown in FIG. 3 between a R/W coil 101 provided within a R/W unit 1 and a card coil 201 formed in the proximity radio card 2. Thus, the power transmitting wave and signal wave in the ASK modulation system are equivalent to different frequency components as viewed from a frequency region or domain. However, the amplitude of the power transmitting wave simply varies according to a signal velocity as viewed from a time domain. In other words, the modulated wave produced by multiplying the power transmitting wave by the signal-wave is seen in the time domain as if the waveform amplitude of the power transmitting wave simply varies upward and downward. When the modulated wave is transmitted by radio, it is also considered that the power transmitting wave and the signal wave be transmitted through separate antennas respectively. In the present invention, however, the field intensity is limited to be within the Wireless Telegraphy Act (500 $\mu$V/m at a distance of 3 m) and the modulated wave is transmitted through a single antenna (R/W coil) 101, in order to simplify the noncontact card (proximity radio card: IC card) 2.

Namely, the R/W (Reader/Writer) unit 1 comprises a power supply 105 for generating a high frequency voltage of 13.56 MHz, an encoder circuit 107 for encoding input data (DATA) 106 to be transmitted to the proximity radio card 2, a modulator 108 for superimposing a voltage being amplitude modulated (Amplitude Shift Keying modulation) by a signal encoded by the encoder circuit 107 on a high frequency voltage of 13.56 MHz generated from the power supply 105, a transmitting amplifier 109 for amplifying a signal ASK-modulated and superimposed on the high frequency voltage of 13.56 MHz by the modulator 108, a matching circuit (feeding circuit) 102 for coupling a signal amplified by the transmitting amplifier 109 thereto through an inductance coupling 103 and having a capacitor 104 to make impedance matching, thereby preventing impedance reflection, a R/W coil 101 for generating an electromagnetic wave to transmit power and data according to the output of the matching circuit 102 and receiving data transmitted from a card coil 201 of the proximity radio card 2 by the electromagnetic wave, a filter circuit 110 for removing a noise component from a signal produced through the inductance coupling 103 by taking matching to the signal received by the R/W coil 101 with the matching circuit 102, a receiving amplifier 111 for amplifying a signal obtained from the filter circuit 110, a demodulator 112 for demodulating the signal amplified by the receiving amplifier 111 using the voltage signal of the high frequency of 13.56 MHz obtained from the power supply 105, and a decoder circuit 113 for decoding the signal demodulated by the demodulator 112 and outputting the decoded signal as received data (DATA) 114 therefrom.

The proximity radio card (noncontact card: IC card) 2 comprises a card coil 201 for receiving an electromagnetic wave generated to perform transmission of power and data from the R/W coil 101 of the R/W unit 1 and generating an electromagnetic wave corresponding to the transmitting data subjected to load-switching modulation; a radio chip 202 comprising: a matching and rectifier circuit 203 for rectifying the power of 13.56 MHz received by the card coil 201 and performing impedance matching to the transmitting and receiving signals, a power supply circuit 204 for supplying a constant DC voltage 205 of about 2 to 5 V at a power level of about 5 mW obtained from a rectified induced voltage outputted from the matching and rectifier circuit 203, a clock extracting circuit 206 for extracting a clock from a receiving signal obtained from the matching and rectifier circuit 203, an LPF circuit 207 for removing noise components from the receiving signal obtained from the matching and rectifier circuit 203, a waveform shaping circuit 208 for shaping the waveform of a receiving signal obtained from the LPF circuit 207, and a load switching modulator circuit 209 for subjecting a transmitting signal to load switching modulation, supplying the modulated signal to the matching and rectifier circuit 203 to allow impedance matching and supplying the modulated signal to the card coil 201; and a CPU+interface chip 210 comprising a frequency divider circuit 211 for dividing the frequency of a clock signal extracted by the clock extracting circuit 206 of the radio chip 202 to thereby generate a signal for operating a microcomputer 214, a decoder circuit 212 for decoding a signal obtained from the waveform shaping circuit 208 of the radio chip 202, a receiving data control circuit 213 for controlling decoded data (receiving data) obtained from the decoder circuit 212 and inputting the data to the microcomputer 214, a transmitting data control circuit 215 for obtaining data from the microcomputer 214 by controlling the transmitting data, an encoder circuit 216 for encoding transmitting data obtained from the transmitting data control circuit 215 by controlling them and inputting the data to the load switching modulator circuit 209 of the radio chip 202, and the microcomputer 214 of H8 or the like having a built-in memory for storing information as a card therein and for performing the processing of transmitting and receiving data and the transfer of data with the memory, said CPU+interface chip 210 being supplied with a stable power supply voltage 205 from the power supply circuit 204 of the radio chip 202.

Incidentally, the R/W coil 101 and the card coil 201 for transmitting power by an electromagnetic wave (radio) is used to improve the efficiency of power transmission in a short range or distance. When the coil 201 is formed on the proximity radio card 2, an advantage is brought about in that it is strong against deformation. Both the R/W coil 101 and the card coil 201 may be formed with spiral antennas.

In the proximity radio card system as has been described above, power can be transmitted by radio and further transmission and reception (communication) of information by radio can be performed, between the reader and/or writer 1 and the noncontact card 2 when the noncontact card (proximity radio card: IC card) 2 is made to approach the reader and/or writer 1. In other words, in the proximity radio card system, a power transmitting wave or a communication wave is radiated by a coil or a spiral antenna 101 for the reader and/or writer, and the electromagnetic wave is received by a coil or a spiral antenna 201 on the card side, so that a voltage is induced which operates the circuits on the card side and allows the detection of signals.

Figure 17:
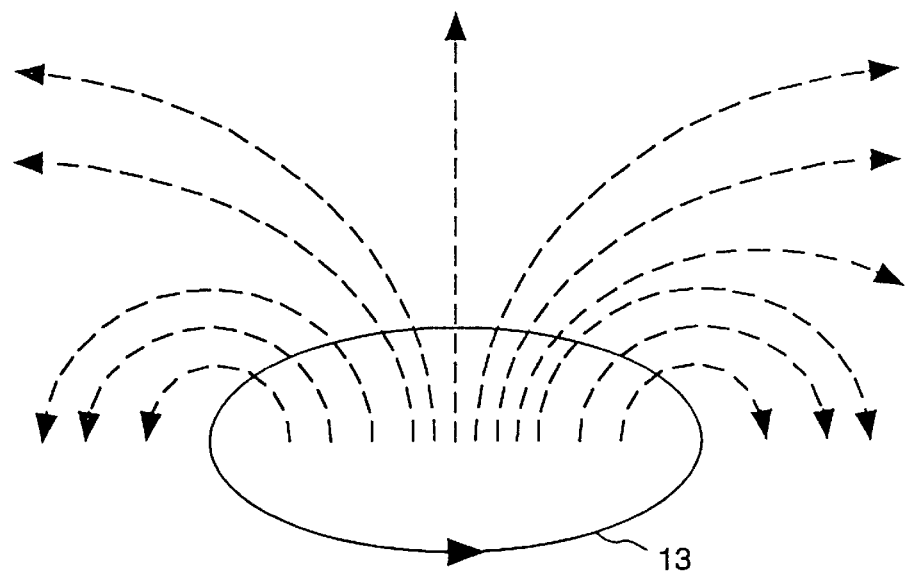
FIG. 17 is a diagram showing the state of generation of a magnetic field by a single coil illustrative of a comparative example of a R/W coil (antenna) mounted to the reader and/or writer according to the present invention.
Figure 18:
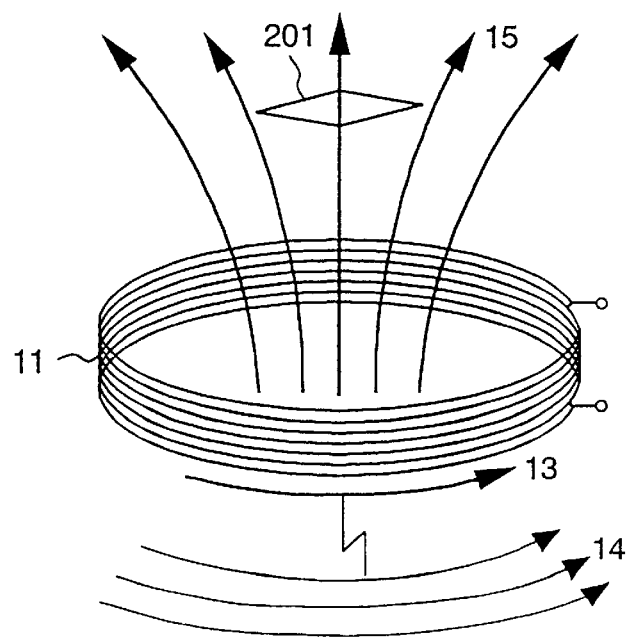
FIG. 18 is a diagram depicting a single coil illustrative of a comparative example of a R/W coil (antenna) mounted to the reader and/or writer according to the present invention and the state of generation of magnetic fields by the single coil.

It is now considered that when the coil or spiral antenna 101 employed in the reader and/or writer 1 is formed as designated at numerals 11 in FIGS. 17 and 18, for example, it is small enough to a wavelength of 22 m determined according to the use frequency of 13.56 MHz and the distribution 13 of a current on the antenna is substantially uniform. Therefore, an electric field 14 is strongly generated in the side direction of the antenna and a magnetic field 15 is strongly produced in the vertical direction thereof.

In this case, when the noncontact card 2 equipped with the coil or spiral antenna 201 is carried or placed in the vertical direction, the power transmitting wave or signal wave can be transmitted and received. However, if the radiation or radiated field is limited to be within the restricted value (500 V/m at a distance of 3 m) of the Wireless Telegraphy Act, then the upper limit of the value 13 of the current flowing through the coil or spiral antenna 11 for the reader and/or writer is determined and thereby the upper limit of the intensity of the magnetic field 15 necessary for power transmission and communications is determined, whereby a communicable range is restricted.

Therefore, one in which the radiated field can meet the restricted value (500 μV/m at the distance of 3 m) of the Wireless Telegraphy Act and the communicable range can be enlarged, is needed as the coil or spiral antenna 101 used for the reader and/or writer 1.

An embodiment of a coil or a spiral antenna 101 attached to a reader and/or writer 1 according to the present invention, which is capable of allowing its radiated field to meet the restricted value (500 μV/m at the distance of 3 m) of the Wireless Telegraphy Act and enlarging a communicable range, will next be explained. Incidentally, when a coil or a spiral antenna for power transmission and a coil or a spiral antenna for transmission or transmission and reception of a communication signal are separately provided, the coil or spiral antenna for power transmission is placed under strict conditions in particular. In the coil or spiral antenna 101 for power transmission, its radiated field needs to satisfy the restricted value (500 μV/m at the distance of 3 m) of the Wireless Telegraphy Act.

Figure 4:
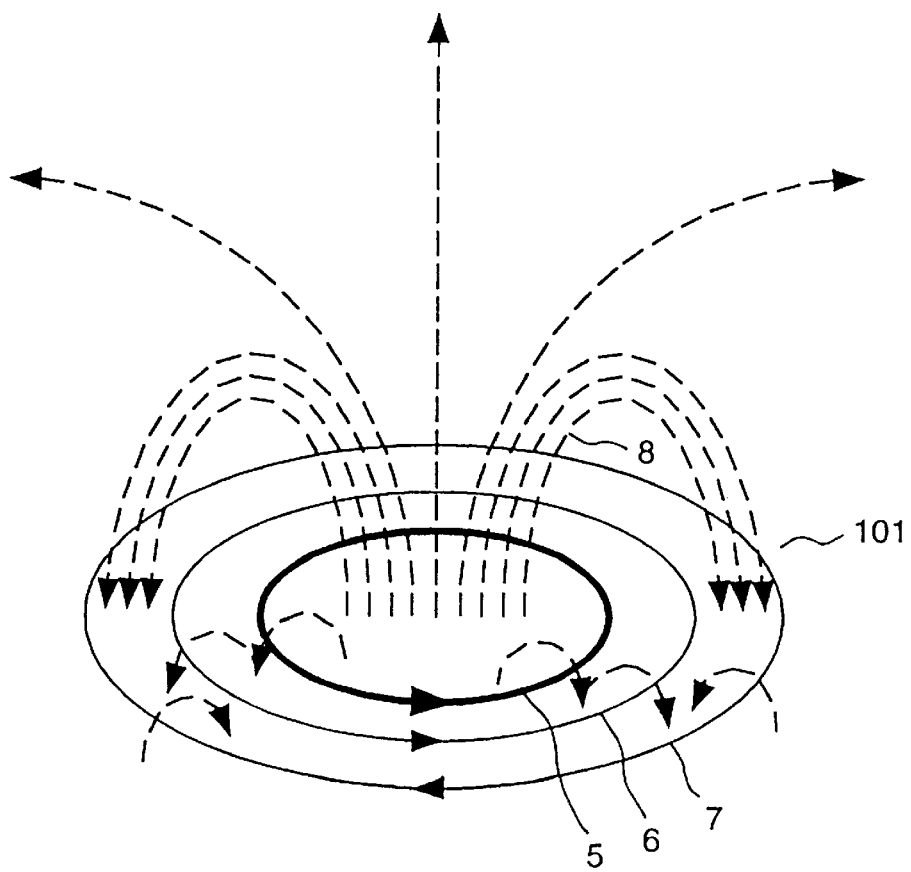
FIG. 4 is a perspective view depicting a basic configuration of a R/W coil (antenna) mounted to a reader and/or writer according to the present invention.
Figure 5:
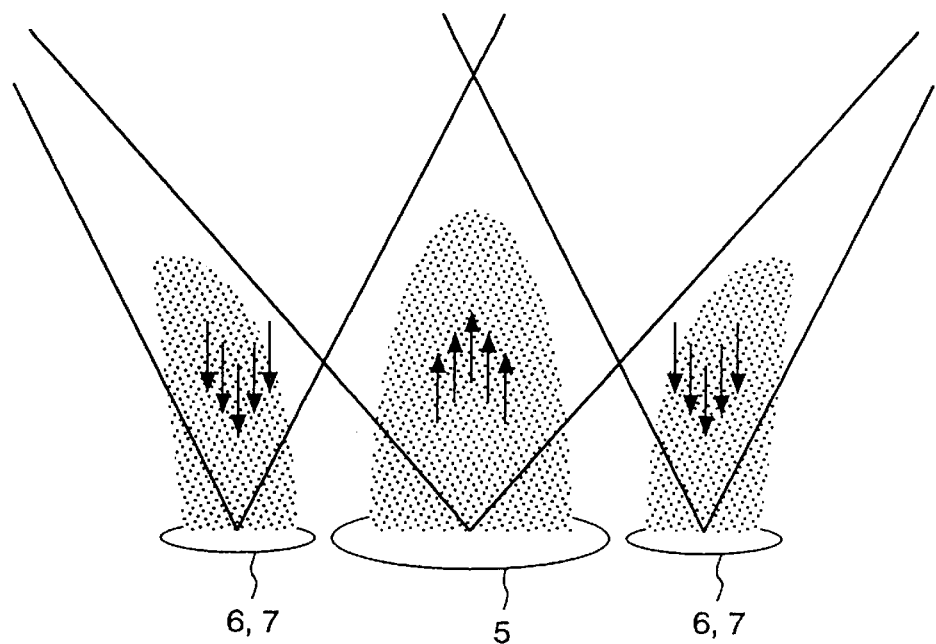
FIG. 5 is a diagram showing the distribution of magnetic fields generated by the basic configuration shown in FIG. 4.
Figure 6:
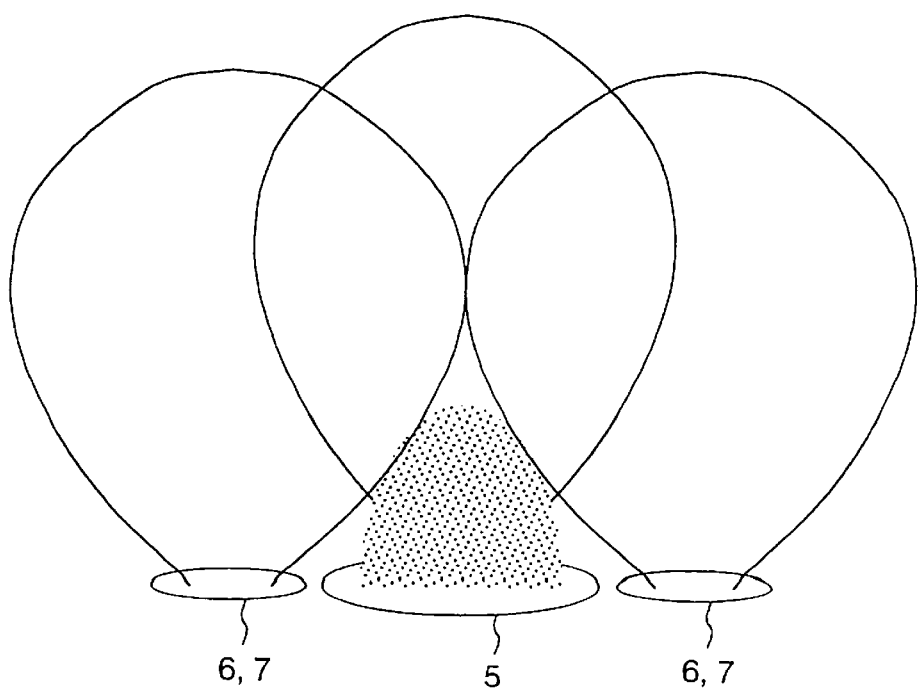
FIG. 6 is a diagram illustrating a state in which owing to the basic configuration shown in FIG. 4, the intensities of electromagnetic fields are canceled and controlled in a great distance and an electromagnetic field induced by a main coil or a spiral antenna is generated so as to be covered in its proximity distance.

FIG. 4 is a diagram showing a basic configuration of a coil or a spiral antenna 101 attached to a reader and/or writer 1 according to the present invention. Reference numeral 5 indicates a main coil or a spiral antenna for the coil or spiral antenna 101 for generating an electromagnetic wave to perform the transmission of power and data. Reference numerals 6 and 7 indicate a pair of auxiliary coils or spiral antennas provided outside (around) the main coil or spiral antenna 5 in order to introduce or bring most of magnetic fields 8 produced by the main coil or spiral antenna 5 therein to prevent them from extending to a great distance and control the intensity of an electromagnetic field in a great distance. The direction of a current to flow through the auxiliary coil or spiral antenna 6 is identical to the direction of a current to flow through the main coil or spiral antenna 5. Further, the direction of a current to flow through the auxiliary coil or spiral antenna 7 is opposite to the direction of the current to flow through the auxiliary coil or spiral antenna 6. As a result, most of the magnetic fields 8 produced by the main coil or spiral antenna 5 are introduced or led in by the pair of auxiliary coils or spiral antennas 6 and 7 as shown in FIG. 5. Thus, the field intensity in the distance is canceled out and thereby becomes weak. It is therefore possible to allow the radiation field to meet the restricted value (500 V/m at the distance of 3 m) of the Wireless Telegraphy Act, increase the upper limit of the value of the current flowing through the main coil or spiral antenna 5 and thereby enlarge a communicable range. Namely, most of the magnetic fields 8 produced by the main coil or spiral antenna 5 are led in by the pair of auxiliary coils or spiral antennas 6 and 7 as shown in FIG. 6. Thus, the intensities of the electromagnetic fields are canceled out in the great distance and thereby reduced or restrained, whereas the electromagnetic field produced by the main coil or spiral antenna 5 is generated so as to be covered in the near or short distance. Even if the value of the current to flow through the main coil or spiral antenna 5 is increased and this electromagnetic filed is rendered strong, the radiation field can meet the restricted value (500 V/m at the distance of 3 m) of the Wireless Telegraphy Act. As a result, the communicable range and the distance to space the proximity radio card 2 away from the reader and/or writer 1 can be enlarged.

An embodiment of an antenna 101a whose electromagnetic field intensity is controlled or restrained in the distance, will next be explained as a coil or a spiral antenna 101 mounted to a reader and/or writer according to the present invention by reference to FIG. 7. Namely, the antenna 101a comprises a main portion 28 and auxiliary portions 29 placed therearound, which are opposed to one another in current turning direction. Thus, magnetic fields 26a and 27b generated from the portions 28 and 29 respectively are opposed in phase to one another and thereby cancel out each other. Further, the cancel auxiliary coil or spiral antenna 29 is caused to have a width so smaller than a wavelength determined according to the frequency to be used. By doing in this way, currents 22a and 24a, which flow through the coil or spiral antenna 29, are opposite in direction to each other. As a result, electric fields 23a and 25a induced by the currents 22a and 24a are also opposite in direction to each other and thereby cancel out each other. Similarly, an electric field 23b induced by a current 22b, which flows through the central main coil or spiral antenna 28, is also opposite in direction to an electric field 25b induced by a current 24b, which flows through the cancel auxiliary coil or spiral antenna 29 and thereby they cancel out each other. As a result, the intensities of the electric fields in the distance cancel out each other and thereby become weak. Thus, the upper limit of the current to flow through the main coil or spiral antenna 28 for obeying the Wireless Telegraphy Act can be increased and a communicable range can be enlarged. It can be understood here that although the magnetic fields cancel out each other in the same manner as described above, they become weak due to the synthesis of antenna directivities because only the magnetic field 26a produced by the central main coil or spiral antenna 28 is detected at a coil or a spiral antenna 201a on the card side in the neighborhood thereof above the central main coil or spiral antenna 28 and the component of synthesis of the magnetic field 26a generated by the central coil or spiral antenna 28 and the magnetic field 27a produced by the cancel auxiliary coil or spiral antenna 29 is detected at the coil or spiral antenna 201b on the card side in the distance above the central main coil or spiral antenna 28.

It can be understood from this point of view that the antenna 101a according to the present embodiment produces large magnetic fields in proximity thereto as compared with antennas shown in FIGS. 17 and 18 and is capable of obeying the Wireless Telegraphy Act, and it serves as an antenna suitable for a card reader and/or writer.

Embodiments shown as further-improved distant electromagnetic field cancel-type antennas I101b and II101c each used as the coil or spiral antenna 101 mounted to the reader and/or writer according to the present invention will further be described with reference to FIGS. 8 and 9.

Figure 8:
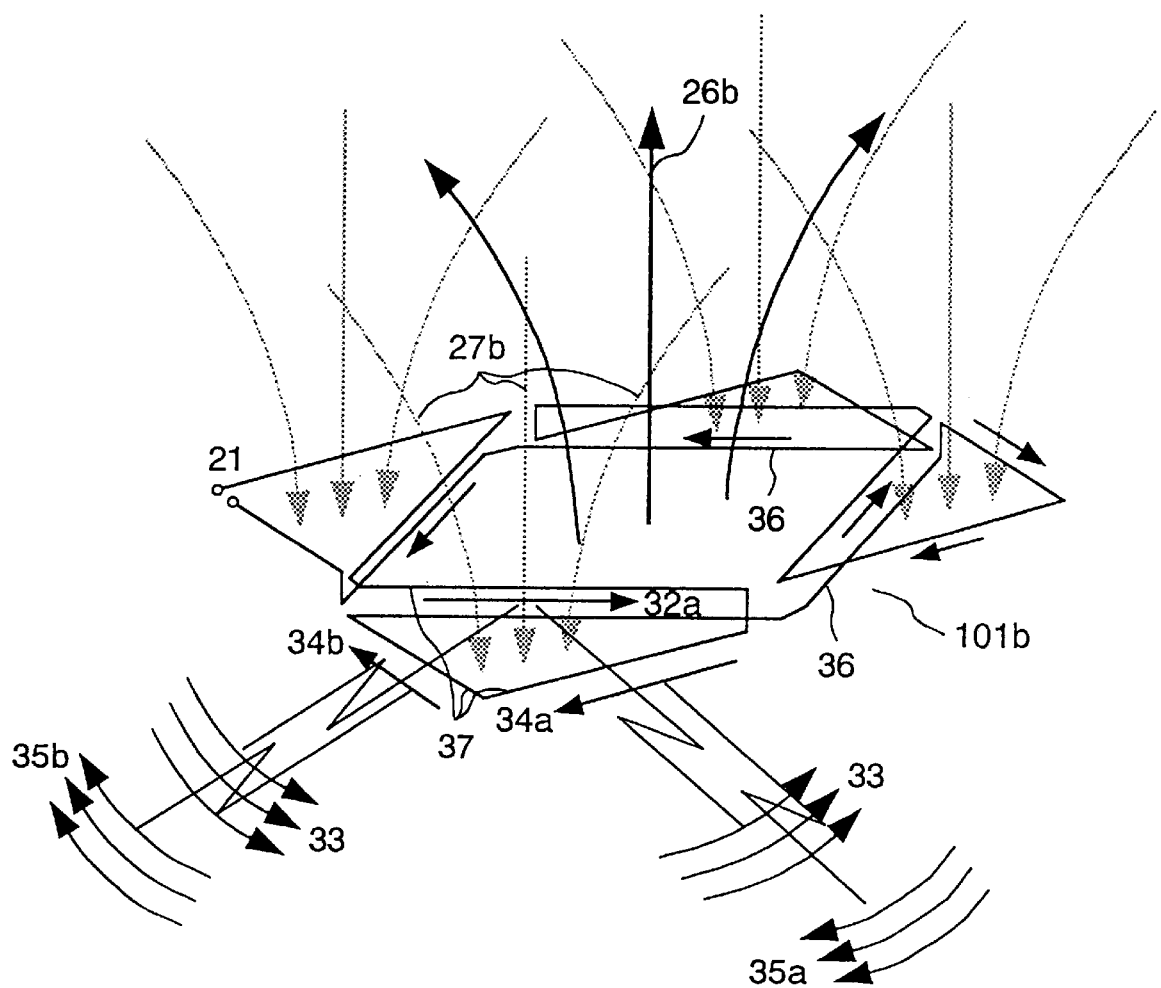
FIG. 8 is a perspective view showing a distant electromagnetic field cancel-type antenna I illustrative of another embodiment of a R/W coil (antenna) mounted to the reader and/or writer according to the present invention.

The antenna (distance electromagnetic filed cancel-type antenna I) 101b shown in FIG. 8 generates a magnetic field 26a through a central main coil or a spiral antenna 36 to perform power transmission and communications. In order to allow radiation produced by the magnetic field to fall within the restricted value of the Wireless Telegraphy Act at a distance of 3 m, a reversely-wound antenna 37 is used to generate an anti-phase magnetic field 27b. Thus, the magnetic fields produced in the vertical direction of the antenna 101b cancel out each other. With respect to the electric fields produced in the side directions, electric fields 33 produced by a side 32a of the central main coil or spiral antenna 36, and an electric field 35a generated by a side 34a of the reversely-wound auxiliary antenna 37 and an electric field 35b generated by a side 34b thereof are canceled out one another in the respective directions respectively. Judging from the above description, the magnetic field 26b produced by the central main coil or spiral antenna 36 allows power transmission and communications since it is dominant in the neighborhood above the central main coil or spiral antenna 36. Further, since the magnetic field is canceled out in the distance by the magnetic field 27b produced by the reversely-wound auxiliary antenna 37, the magnetic field 26b permits power transmission and communications in the near or short distance while satisfying the restricted value of the Wireless Telegraphy Act at the distance of 3 m.

Figure 7:
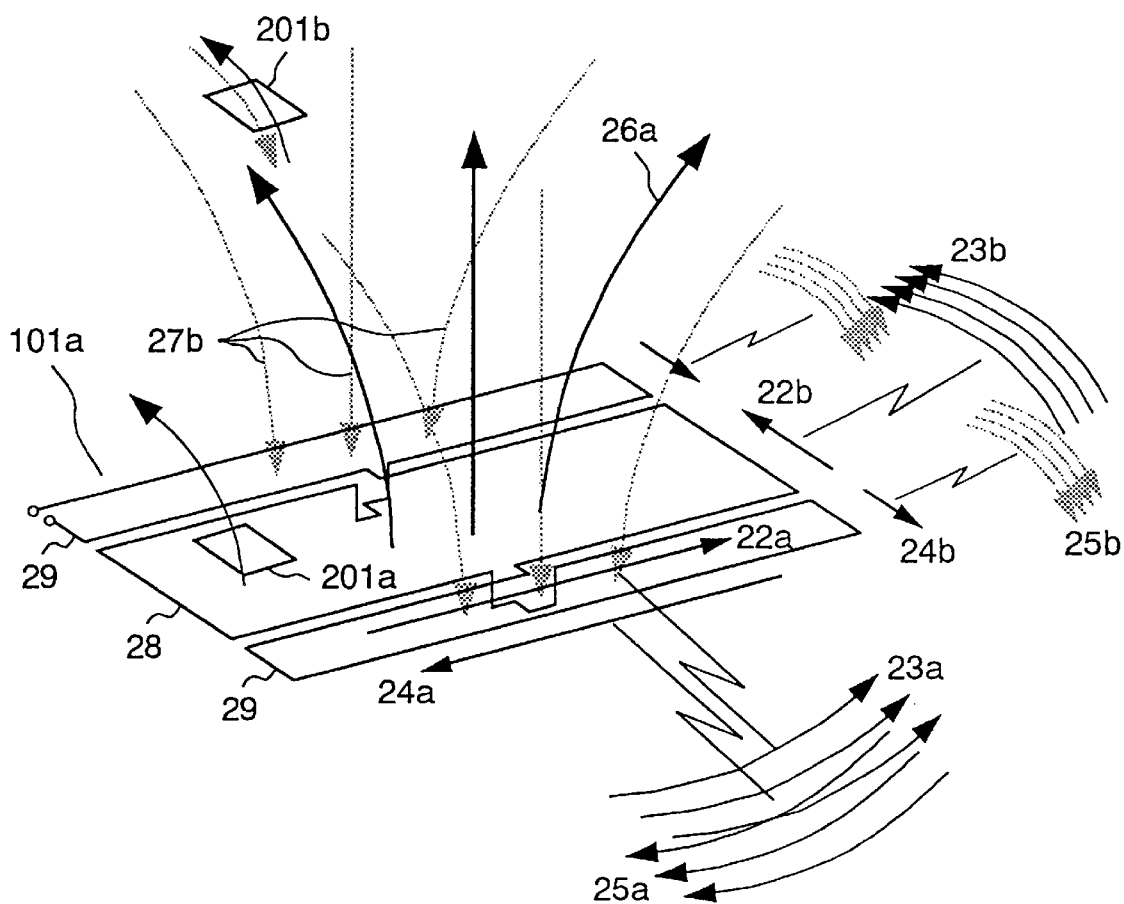
FIG. 7 is a perspective view depicting a basic configuration of an embodiment of a R/W coil (antenna) mounted to a reader and/or writer according to the present invention.
Figure 9:
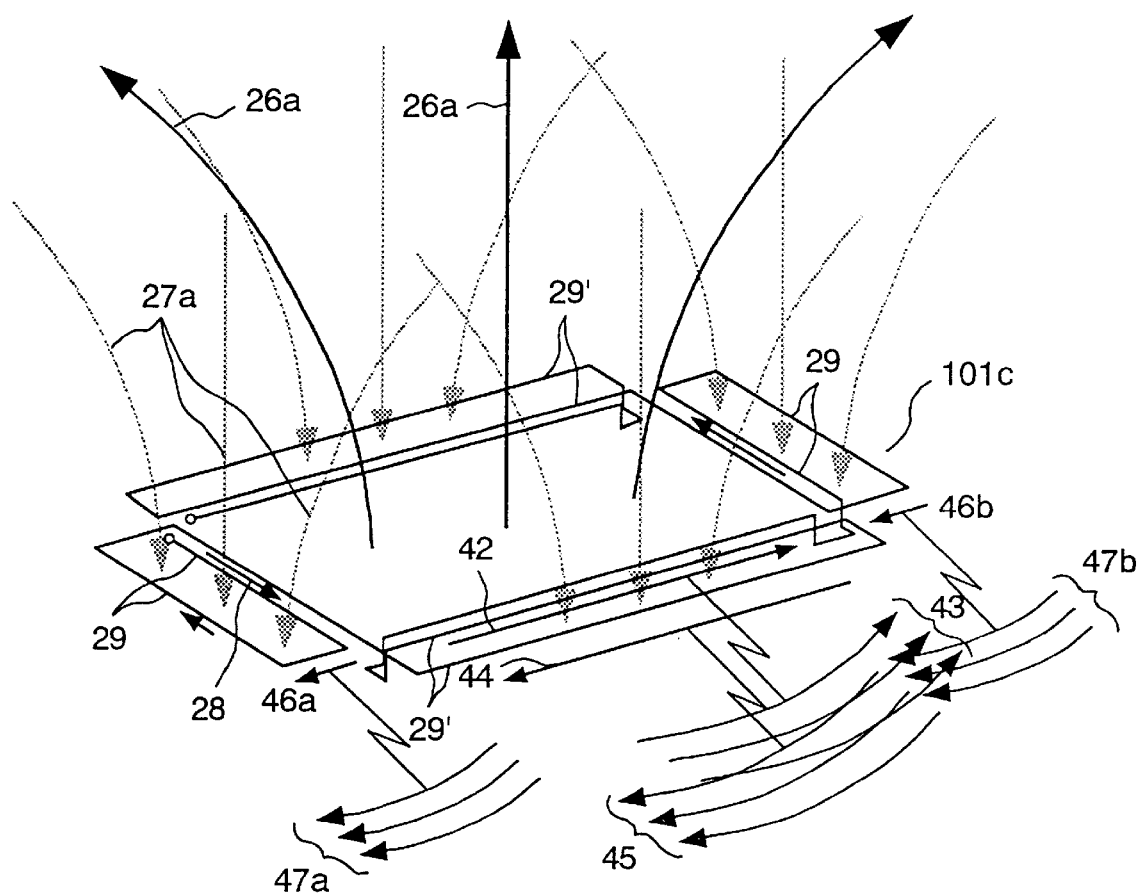
FIG. 9 is a perspective view illustrating a distant electromagnetic field cancel-type antenna II illustrative of a further embodiment of a R/W coil (antenna) mounted to the reader and/or writer according to the present invention.

The antenna (distant electromagnetic field cancel-type antenna II) 101c shown in FIG. 9 has an advantageous effect in that magnetic fields 26a radiated in side directions in which no anti-phase auxiliary antennas 29 exist in the antenna 101a shown in FIG. 7, are canceled out and thereby weakened by preparing anti-phase auxiliary antennas 29' even in the sides directions and generating anti-phase magnetic fields 27a by the prepared auxiliary antennas 29'. With respect to field radiation in each side direction, an electric field 43 radiated by a current 42 flowing through the side of a central main antenna 28 is canceled out by an electric field 45 radiated by a current 44 flowing through the side of the anti-phase auxiliary antenna 29'. Thus, only electric fields 47a and 47b radiated by currents 46a and 46b flowing through the sides of the anti-phase auxiliary antennas adjoining the anti-phase auxiliary antenna 29' remain. Therefore, the antenna 101c shown in FIG. 9 is characterized in that the electric fields in the side directions can be reduced as compared with a simple loop-shaped antenna and the magnetic fields leaking to the sides can be restrained as compared with the antenna shape shown in FIG. 7.

Figure 10:
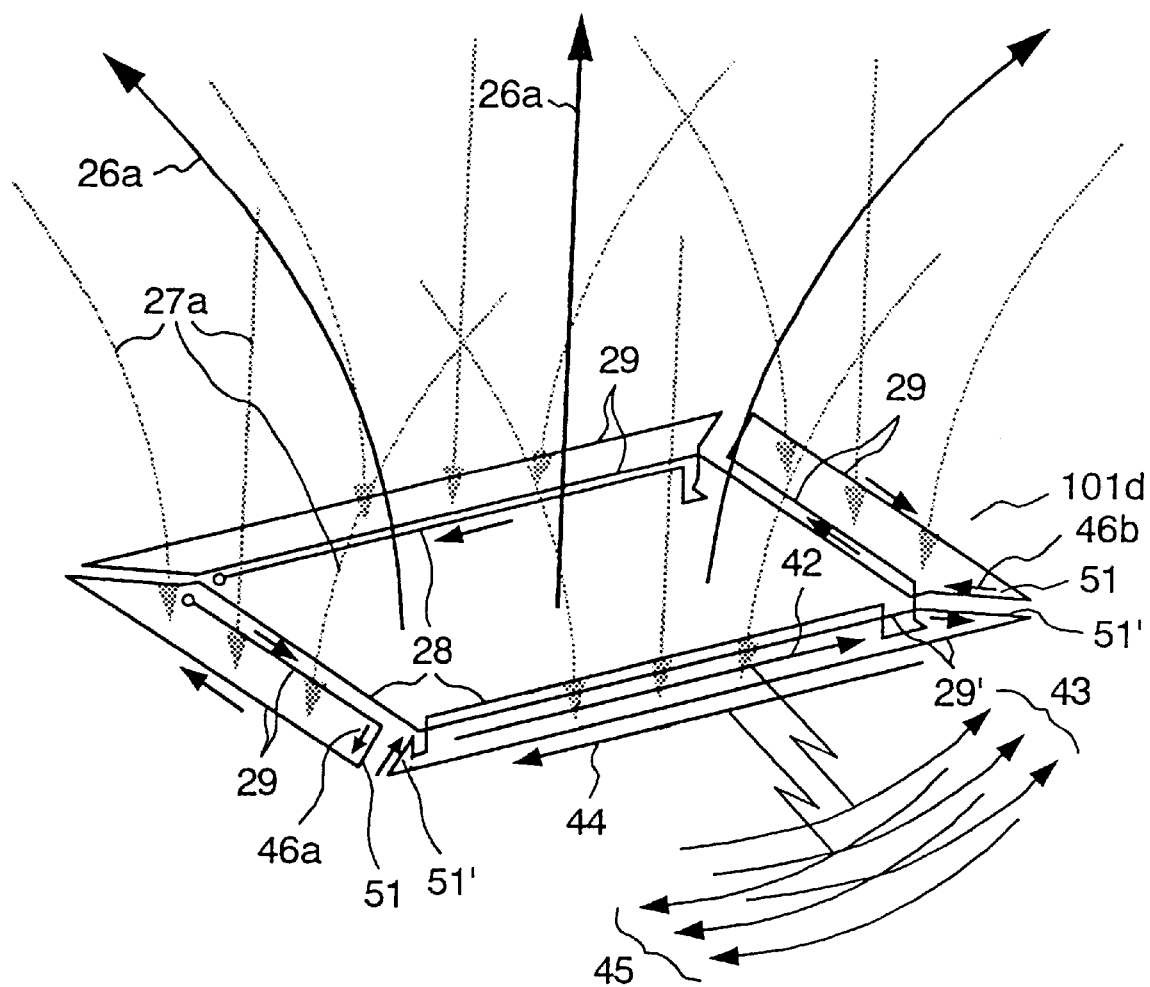
FIG. 10 is a perspective view depicting a distant electromagnetic field cancel-type antenna III illustrative of a still further embodiment of a R/W coil (antenna) mounted to the reader and/or writer according to the present invention.

An antenna (distant electromagnetic field cancel-type antenna III) 101d shown in FIG. 10 is equivalent to one in which sides 51' of anti-phase auxiliary antennas 29', which respectively adjoin sides 51 of anti-phase antennas 29 for generating the side-direction electric fields 47a and 47b in the antenna shown in FIG. 9, are caused to draw currents opposite in direction to currents 46a and 46b flowing through the sides 51 of the anti-phase antennas 29 in an opposing relationship to the sides 51 thereof to thereby control or restrain the generation of the electric fields. Since, in this case, an electric field 43 produced by a current 42 flowing through each side of a central main antenna 28 and an electric field 45 produced by a current 44 flowing through the side of the anti-phase auxiliary antenna 29, cancel out each other, the present antenna 101d can restrain the side-direction electric fields as compared with the antenna 101c shown in FIG. 9.

Figure 11:
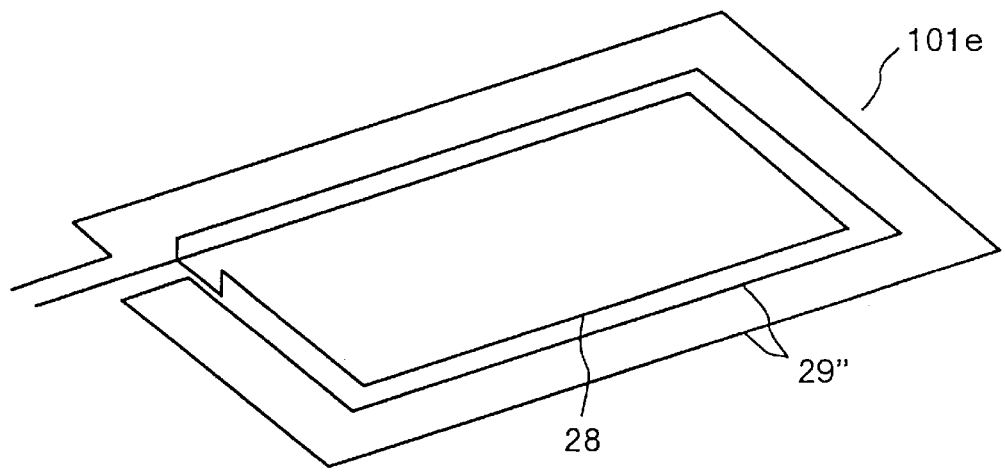
FIG. 11 is a perspective view showing a distant electromagnetic field cancel-type antenna IV illustrative of a still further embodiment of a R/W coil (antenna) mounted to the reader and/or writer according to the present invention.

An antenna (distant electromagnetic field cancel-type antenna IV) 101e shown in FIG. 11 has a shape free of the sides which adjoin each other between the anti-phase antennas employed in the antenna 101d shown in FIG. 10, and comprises a combination of a central main coil or a spiral antenna 28 and an auxiliary coil or a spiral antenna 29" for generating an anti-phase magnetic field. Here, the present antenna 101e is substantially similar to the antenna 101d shown in FIG. 10 in the state of generation of the electromagnetic field. However, since the central main coil or spiral antenna 28 and the respective anti-phase coils or spiral antennas 29 and 29, can be independently supplied with power in the antenna 101d shown in FIG. 10, an antenna line length can be sufficiently shortened whereas since each anti-phase auxiliary coil or spiral antenna 29" has a single structure in the antenna structure shown in FIG. 11, the antenna line length becomes long. However, since the present antenna 101e is simple in structure where the wavelength determined according to a frequency of 13.56 MHz to be used is enough long and the line length of the antenna is enough short, the present antenna has a feature that the manufacturing cost can be reduced.

Figure 12:
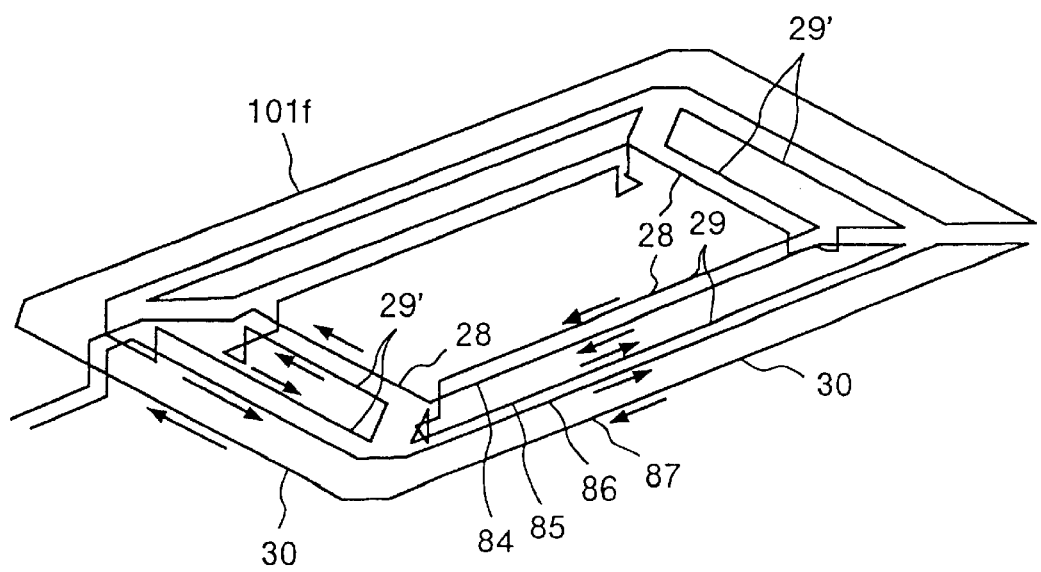
FIG. 12 is a perspective view illustrating a distant electromagnetic field cancel-type antenna V illustrative of a still further embodiment of a R/W coil (antenna) mounted to the reader and/or writer according to the present invention.

An antenna (distant electromagnetic field cancel-type antenna V) 101f shown in FIG. 12 is equivalent to one in which a central main coil or a spiral antenna 28 and an in-phase driven or excited auxiliary coil or a spiral antenna 30 are utilized in combination so that magnetic fields produced by anti-phase auxiliary coils or spiral antennas 29 and 29' prepared to cancel a distant magnetic field in a magnetic field generated by the central main coil or spiral antenna 28 are further canceled out each other to prevent their leakage in the side directions of the reader and/or writer. In the present antenna 101f, the magnetic field produced by the central main coil or spiral antenna 28 is canceled out in an upper range by the anti-phase auxiliary coils or spiral antennas 29 and 29'. However, the magnetic fields produced by the anti-phase auxiliary coils or spiral antennas 29 and 29' remain outside the sides of the present antenna 101f. In order to cancel out the magnetic fields, the auxiliary coil or spiral antenna 30 being identical in phase to the central main coil or spiral antenna 28 for generating the magnetic field opposite in phase to the magnetic fields generated by the anti-phase auxiliary coils or spiral antennas 29 and 29' is further prepared outside the sides thereof. Here, the interval defined between opposite sides 84 and 85 of each of the anti-phase auxiliary coils or spiral antennas 29 and 29' is narrow with respect to the central main coil or spiral antenna 28. Therefore, the interval between opposite sides 86 and 87 of the coil or spiral antenna 30 prepared outside the sides of the antenna 101f can be rendered narrow and the electric fields radiated outside the sides thereof can be effectively canceled out. As a result, the electric fields lying outside the sides can be also restrained.

Figure 13:
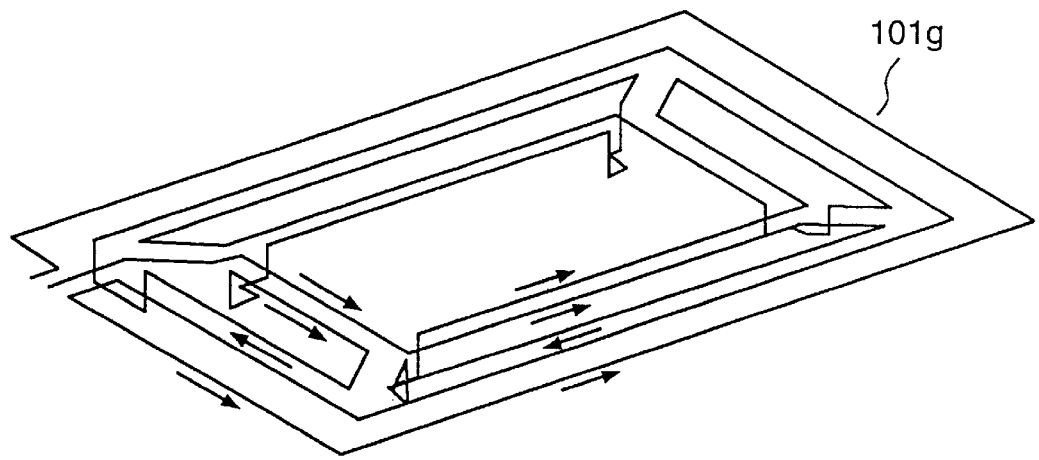
FIG. 13 is a perspective view depicting a distant electromagnetic field cancel-type antenna VI illustrative of a still further embodiment of a R/W coil (antenna) mounted to the reader and/or writer according to the present invention.

An antenna (distant electromagnetic field cancel-type antenna VI) 101g shown in FIG. 13 exhibits the same effect as that obtained by the antenna 101f shown in FIG. 12. Further, the entire antenna comprises a continuous line and is singly supplied with power. In a manner similar to the antenna 101e shown in FIG. 11, the present antenna 101g has a feature that although a problem arises in that when a line length is longer than a wavelength determined according to a frequency to be used, a current flowing on an antenna line is phase-inverted, the distribution of an electromagnetic field is disturbed and a canceling effect becomes weak, the present antenna 101g shows the same effect as that obtained in the antenna 101f shown in FIG. 12 if the line length is sufficiently shorter than the wavelength, and its manufacturing cost can be reduced because the antenna 101g is simple in structure.

Figure 14:
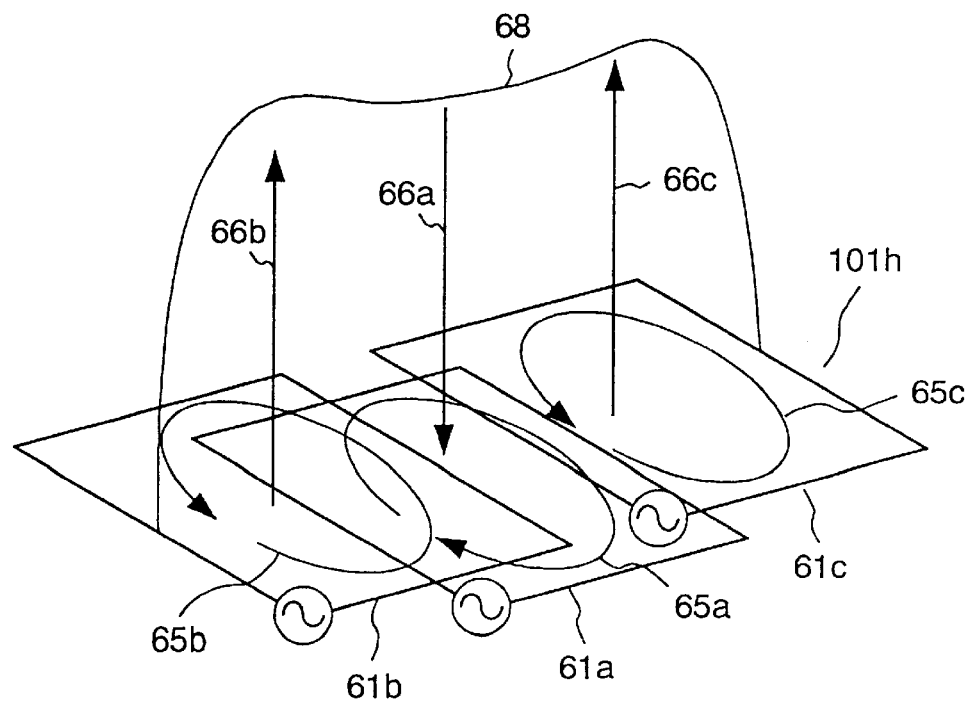
FIG. 14 is a perspective view showing a distant electromagnetic field cancel-type antenna VII illustrative of a still further embodiment of a R/W coil (antenna) mounted to the reader and/or writer according to the present invention.

An antenna (distant electromagnetic field cancel-type antenna VII) 101h shown in FIG. 14 is equivalent to an antenna having a plurality of coils or spiral antennas 61a, 61b and 61c and in which they are antiphase-excited or driven each other or the directions of currents are opposite to one another as designated at numerals 61a, 61b and 61c. Thus, a magnetic field 66a produced by the central main coil or spiral antenna 61a of the three coils or spiral antennas 61a, 61b and 61c, for example is dominant in the neighborhood directly above the central main coil or spiral antenna 61a. However, the magnetic field 66a is canceled out in the distance above the magnetic field 66a produced from the central main coil or spiral antenna 61a by magnetic fields 66b and 66c produced by the adjoining auxiliary coils or spiral antennas 61b and 61c antiphase-excited or whose current directions are opposite to the current direction of the central main coil or spiral antenna 61a. Further, the electric fields produced in the side directions are also canceled out in the same manner as described above. Therefore, the coils or spiral antennas can generate strong magnetic fields in the near distance as compared with a single coil while satisfying the Wireless Telegraphy Act. Namely, the central main coil or spiral antenna 61a and the auxiliary coils or spiral antennas 61b and 61c provided in close proximity (adjacent) thereto are supplied with power (e.g., antiphase-excited if specifically described) in a state of being different in phase from each other to thereby generate magnetic fields 66a, 66b and 66c. As a result, the magnetic field 66a in the upper distance can be canceled out by the magnetic fields 66b and 66c and the electric fields in the side directions can be also canceled out in the same manner as described above. Further, the coils or spiral antennas can generate strong magnetic fields in the near distance as compared with the single coil while the Wireless Telegraphy Act is being met. The present embodiment shows the case in which the central main coil or spiral antenna 61a and the auxiliary coils or spiral antennas 61b and 61c provided in proximity (adjacent) thereto are arranged one-dimensionally (in a uniaxial direction). It is however apparent that they may be arranged two-dimensionally (in a biaxial direction: x- and y-axis directions) as shown in FIGS. 8 through 13.

In the embodiment described above, the magnetic fields produced by the auxiliary coils or spiral antennas 29, 29', 29", 61b and 61c are opposite in phase to or axially opposed to the magnetic fields produced by the main coils or spiral antennas 28 and 61a to thereby cancel out the magnetic fields in the upper distance and similarly cancel out the electric fields in the side directions. Thus, the coils or spiral antennas can generate strong magnetic fields in the near distance as compared with the single coil and a communicable range can be enlarged, while satisfying the Wireless Telegraphy Act.

Figure 15:
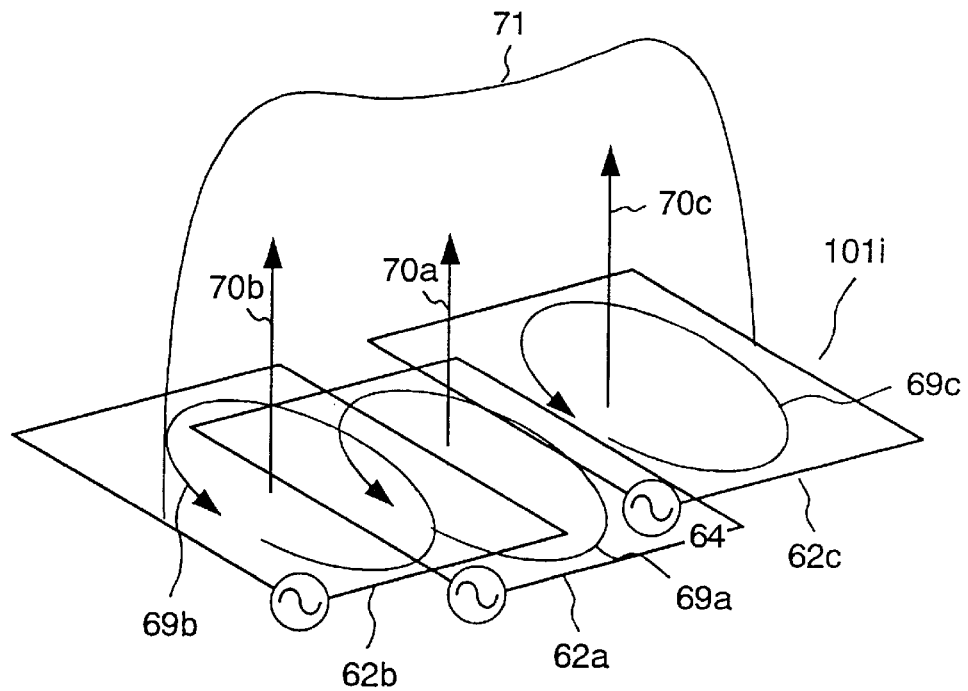
FIG. 15 is a perspective view depicting a near magnetic field uniform-type antenna illustrative of a still further embodiment of a R/W coil (antenna) mounted to the reader and/or writer according to the present invention.

An antenna (near magnetic field uniform-type antenna) 101i shown in FIG. 15 shows an antenna having a plurality of coils or spiral antennas 62a, 62b and 62c and in which they are inphase-excited or driven each other or the directions of currents are made identical to one another as designated at numerals 69a, 69b and 69c. In the present embodiment, currents, which flow through the respective antennas 62a, 62b and 62c, need to be reduced as compared with the single coils shown in FIGS. 17 and 18 in order to satisfy the Wireless Telegraphy Act. However, since a magnetic field distribution 71 located above the antenna 101i can be made more uniform over a wide transverse area as compared with the single coil, a communicable transverse area can be enlarged. It is desirable that the currents to flow through the outer coils or spiral antennas 62b and 62c in particular are made greater than the current to flow through the central coil or spiral antenna 62a. Namely, it is desirable that the currents or power is supplied to the coils or spiral antennas such that the amplitude of the current of each of the outer coils or spiral antennas 62b and 62c is made greater than and different from the amplitude of the current to flow through the central coil or spiral antenna 62a.

When antiphase currents are respectively supplied to all the coils or spiral antennas 62a, 62b and 62c in the antenna 101i according to the present embodiment, a power transmittable area can be enlarged. In this case, it is necessary to shift (convert) the phases of power to, e.g., 0, 90, 180 in the case of the transmission of the power to the respective coils or spiral antennas 62a, 62b and 62c, and feed communication signal waves to them in the same phase, respectively. Namely, this is because the communication signal waves cannot be transmitted or transmitted or received unless they are supplied to the coils or spiral antennas 62a, 62b and 62c in the same phase. The present embodiment shows the case in which the central main coil or spiral antenna 62a and the auxiliary coils or spiral antennas 62b and 62c provided in proximity (adjacent) thereto are arranged one-dimensionally (in a uniaxial direction). It is however apparent that they may be arranged two-dimensionally (in a biaxial direction: x- and y-axis directions) as shown in FIGS. 8 through 13.

Figure 16:
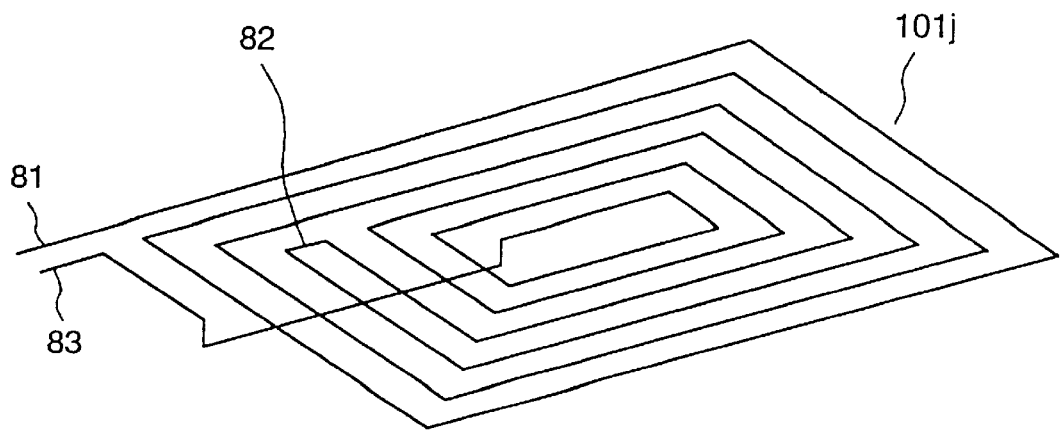
FIG. 16 is a diagram showing the shape of an in-phase excited antenna illustrative of a still further embodiment of a R/W coil (antenna) mounted to the reader and/or writer according to the present invention.

The shape of an antenna shown in FIG. 16 corresponds to that of an in-phase driven or excited embodiment. However, the present antenna 101j is a spiral array antenna utilizing that when a feeding method is used in which the length of a line thereof extending from a feeding point 81 to a folded position 82 is equal to a length of 11 m corresponding to half of a wavelength 22 m determined according to a frequency of 13.56 MHz to be used, or the phase of a current is inverted at the folded position 82, a magnetic field generated by the line extending from the feeding point 81 to the folded position 82 and a magnetic filed generated by a line extending from the folded position 82 to a ground position 83 are in phase with each other and intensified each other. Owing to the placement of such a spiral array antenna 101j in the reader and/or writer 1, the distribution of the magnetic field above the antenna can be made more evenly over a wide transverse area as compared with the single coils shown in FIGS. 17 and 18 in a manner similar to the embodiment shown in FIG. 15. As a result, a communicable transverse area can be enlarged while the present antenna satisfies the Wireless Telegraphy Act.

According to the present invention as has been described above, an advantageous effect can be brought about in that a coil or an antenna, which is mounted to a reader and/or writer and particularly supplies operating power to an IC card, is constructed so as to control or restrain the intensity of an electromagnetic field at a distance of 3 m restricted by the Wireless Telegraphy Act, thereby making it possible to supply large power to the card side in the neighborhood of the reader and/or writer while meeting the Wireless Telegraphy Act in the distance, and consequently transmit operating power to an IC card such as a CPU or the like having a large power consumption of about 5 mW, for example, while meeting the Wireless Telegraphy Act.

According to the present invention as well, an advantageous effect can be brought about in that a coil or an antenna, which is installed in a reader and/or writer and performs the supply of operating power to an IC card and transmission or transmission and reception of a communication signal to and from the IC card is constructed so as to control or restrain the intensity of an electromagnetic field at a distance of 3 m restricted by the Wireless Telegraphy Act, thereby making it possible to supply large power to the card side in the vicinity of the reader and/or writer while satisfying the Wireless Telegraphy Act in the distance and consequently transmit operating power to an IC card such as a CPU or the like having a large power consumption of about 5 mW, for example, while meeting the Wireless Telegraphy Act.

Further, according to the present invention, an advantageous effect can be brought about in that a coil or an antenna, which is mounted to a reader and/or writer and particularly supplies operating power to an IC card, is constructed so as to allow an upper magnetic field distribution to be made more evenly over a wide transverse area and permit the scale-up of a communicable transverse area, so that operating power can be transmitted to an IC card such as a CPU or the like having a large power consumption of about 5 mW, for example, while the Wireless Telegraphy Act is being met.

Moreover, according to the present invention, an advantageous effect can be brought about in that a coil or an antenna, which is placed in a reader and/or writer and performs the supply of operating power to an IC card and transmission or transmission and reception of a communication signal to and from the IC card, is constructed so as to allow an upper magnetic field distribution to be made more evenly over a wide transverse area and permit the scale-up of a communicable transverse area, so that operating power can be transmitted to an IC card such as a CPU or the like having a large power consumption of about 5 mW, for example, while the Wireless Telegraphy Act is being met.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A reader/writer comprising:

a power supply portion which generates a voltage as a power transmission signal to be supplied to an IC card;

an encoder circuit which encodes an input communication data and outputs an encoded communication signal to be transmitted to the IC card;

an amplitude-modulator which superimposes a signal being amplitude-modulated by the encoded communication signal outputted from said encoder circuit on the signal generated from said power supply portion and outputs an amplitude-modulated signal;

a feeding circuit which feeds the amplitude-modulated signal outputted from the amplitude-modulator as a current signal;

an antenna which generates an electromagnetic wave to perform transmission of both operating power and communication to the IC card; and wherein said antenna comprises a main coil which generates an electromagnetic field used for transmission of both said operating power and said communication by feeding the current signal from the feeding circuit and a plurality of auxiliary coils which are disposed with substantially symmetry with respect to said main coil and which generate magnetic fields opposite in phase to a magnetic field generated by said main coil by feeding the current signal from the feeding circuit to thereby restrain an intensity of the electromagnetic field at a distance.

2. A reader/writer comprising:

a power supply portion which generates a voltage as a power transmission signal to be supplied to an IC card;

an encoder circuit which encodes an input communication data and outputs an encoded communication signal to be transmitted to the IC card;

an amplitude-modulator which superimposes a signal being amplitude modulated by the encoded communication signal outputted from said encoder circuit on the signal generated from said power supply portion and outputs an amplitude-modulated signal;

a feeding circuit which feeds the amplitude-modulated signal outputted from the amplitude-modulator as a current signal;

an antenna which generates an electromagnetic wave to perform transmission of both operating power and communication to the IC card; and wherein said antenna comprises a main coil which generates an electromagnetic field used for transmission of both said operating power and said communication by feeding the current signal from the feeding circuit and a plurality of auxiliary coils which are disposed with substantially symmetry with respect to said main coil and which generate axial magnetic fields in a direction opposite to a magnetic field generated by said main coil by feeding the current signal from the feeding circuit to thereby restrain an intensity of the electromagnetic field at a distance.

3. A reader/writer according to claim 1 or 2, wherein each of said main coil and said auxiliary coils is respectively supplied with each of currents which has a contrary phase with each other.

4. A reader/writer according to claim, 1 or 2, wherein each of said main coil and said auxiliary coils is respectively set with each of winding directions which are reverse with each other.

5. A reader/writer according to claim 1 or 2, wherein each of said main coil and said auxiliary coils is respectively supplied with each of currents which has a contrary phase with each other as to a power transmitting wave and is supplied with each of currents which has an identical phase with each other as to a communication signal wave.

6. A reader/writer according to claim 1 or 2, wherein said auxiliary coils are provided outside of said main coil.

7. A reader/writer according to claim 1 or 2, wherein further comprising sub-auxiliary coils which are provided outside of said auxiliary coils and which generate magnetic fields of identical phase for said magnetic field of said main coil.

8. A reader/writer according to claim 1 or 2, wherein said main coil and said plurality of the auxiliary coils are formed by a monolithic wiring.

9. A reader/writer according to claim 1 or 2, wherein said plurality of auxiliary coils are formed by first and second auxiliary coils which are symmetrically provided on opposing two sides of said main coil.

10. A reader/writer according to claim 1 or 2, wherein said plurality of auxiliary coils are formed by first and second and third and fourth auxiliary coils which are symmetrically provided on opposing four sides of said main coil.

11. A reader/writer comprising:
a power supply portion which generates a voltage as a power transmission signal to be supplied to an IC card;
an encoder circuit which encodes an input communication data and outputs an encoded communication signal to be transmitted to the IC card;
an amplitude-modulator which superimposes a signal being amplitude-modulated by the encoded communication signal outputted from said encoder circuit on the signal generated from said power supply portion and outputs an amplitude-modulated signal;
a feeding circuit which feeds the amplitude-modulated signal outputted from the amplitude-modulator as a current signal;
an antenna which generates an electromagnetic wave to perform transmission of both operating power and communication to the IC card; and
wherein said antenna comprises a main coil which generates an electromagnetic field used for transmission of both said operating power and said communication by feeding the current signal from the feeding circuit and a plurality of auxiliary coils which are disposed with substantially symmetry with respect to said main coil and which generate magnetic fields by feeding the current signal from the feeding circuit so as to restrain an intensity of the electromagnetic field at a distance.

12. A reader/writer comprising:
a power supply portion which generates a voltage as a power transmission signal to be supplied to an IC card;
an encoder circuit which encodes an input communication data and outputs an encoded communication signal to be transmitted to the IC card;
an amplitude-modulator which superimposes a signal being amplitude-modulated by the encoded communication signal outputted from said encoder circuit on the signal generated from said power supply portion and outputs an amplitude-modulated signal;
a feeding circuit which feeds the amplitude-modulated signal outputted from the amplitude-modulator as a current signal;
an antenna which generates an electromagnetic wave to perform transmission of both operating power and communication to the IC card; and
wherein said antenna comprises a main coil which generates an electromagnetic field used for transmission of both said operating power and said communication by feeding the current signal from the feeding circuit and a plurality of auxiliary coils which are disposed with substantially symmetry for said main coil and which generate magnetic fields by feeding the current signal from the feeding circuit so as to enlarge an area extending in a traverse direction of a magnetic-field intensity distribution being generated by said main coil.

13. A reader/writer according to claim 8, wherein each of said main coil and said auxiliary coils is respectively supplied with each of currents where an amplitude of currents being flowed in said auxiliary coils increases in correspondence with an amplitude of current being flowed in said main coil.

14. A reader/writer according to claim 11 or 12, wherein said main coil and said plurality of the auxiliary coils are formed by a monolithic wiring.

15. A reader/writer comprising:
a power supply portion which generates a voltage as a power transmission signal to be supplied to an IC card;
an encoder circuit which encodes an input communication data and outputs an encoded communication signal to be transmitted to the IC card;
an amplitude-modulator which superimposes a signal being amplitude-modulated by the encoded communication signal outputted from said encoder circuit on the signal generated from said power supply portion and outputs an amplitude-modulated signal;
a feeding circuit which feeds the amplitude-modulated signal outputted from the amplitude-modulator as a current signal;
a spiral antenna which generates an electromagnetic wave to perform transmission of both operating power and communication to the IC card; and
wherein said spiral antenna has a plurality of portions having phase inverse portions of current distribution by reversing direction of turning of said spiral antenna by feeding the current signal from the feeding circuit so that a current flowing in each of said portions has a reverse phase with each other, and an axial magnetic field being generated by flowing the current in each of portions is identical in phase with each other.

16. A reader/writer having an improved constrained main electromagnetic field for performing both the supply of operating power to an IC card and transmission of a communication signal to said IC card or transmission and reception thereof to and from said IC card, comprising:
a main coil which generates a main electromagnetic field used for said power supply and communication; and
a plurality of electromagnetic field distribution control coils with respective ones of said electromagnetic field distribution control coils being disposed with substantially symmetry on opposing sides of said main coil and which generate control electromagnetic fields on opposing sides of said main coil and opposite in phase to said main electromagnetic field generated by said main coil, to cause said control electromagnetic fields to cancel portions of said main electromagnetic field in areas above said electromagnetic field distribution control coils to better constrain said main electromagnetic field to areas directly above said main coil.

17. A reader/writer having an improved constrained main electromagnetic field for performing both the supply of operating power to an IC card and transmission of a communication signal to said IC card or transmission and reception thereof to and from said IC card, comprising:

a main coil which generates a main electromagnetic field used for said power supply and communication; and a plurality of electromagnetic field distribution control coils with respective ones of said electromagnetic field distribution control coils being disposed with substantially symmetry with respect to one another on opposing sides of said main coil and which generate control electromagnetic fields on opposing sides of said main coil and opposite in phase to said main electromagnetic field generated by said main coil, to cause said control electromagnetic fields to cancel portions of said main electromagnetic field at a periphery of said main coil and in areas above said electromagnetic field distribution control coils to better constrain said main electromagnetic field to areas directly above said main coil.

* * * * *